United States Patent
Nishida (10) Patent No.: US 11,398,251 B2
(45) Date of Patent: Jul. 26, 2022

(54) MAGNETIC TAPE CARTRIDGE, RECORDING DEVICE, RECORDING METHOD, REPRODUCING SYSTEM, AND REPRODUCING METHOD

(71) Applicant: FUJIFILM CORPORATION, Tokyo (JP)

(72) Inventor: Kenji Nishida, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 17/022,113

(22) Filed: Sep. 16, 2020

(65) Prior Publication Data

US 2021/0098020 A1    Apr. 1, 2021

(30) Foreign Application Priority Data

Sep. 27, 2019    (JP) .............................. JP2019-176489

(51) Int. Cl.
| | |
|---|---|
| *G11B 23/08* | (2006.01) |
| *G11B 23/03* | (2006.01) |
| *G06K 7/10* | (2006.01) |
| *G11B 23/087* | (2006.01) |
| *G11B 23/04* | (2006.01) |
| *G11B 20/12* | (2006.01) |

(52) U.S. Cl.
CPC ........ *G11B 23/031* (2013.01); *G06K 7/10297* (2013.01); *G11B 23/041* (2013.01); *G11B 23/042* (2013.01); *G11B 23/08707* (2013.01); *G11B 23/08714* (2013.01); *G11B 20/1201* (2013.01)

(58) Field of Classification Search
None
See application file for complete search history.

(56) References Cited

U.S. PATENT DOCUMENTS

| | | | | |
|---|---|---|---|---|
| 5,615,056 A * | 3/1997 | Oguro | ................... | H04N 5/9268 |
| | | | | 386/E5.017 |
| 5,625,517 A * | 4/1997 | Sawada | ................... | G11B 15/07 |
| | | | | 360/137 |
| 5,764,457 A * | 6/1998 | Uhde | ................ | G11B 23/08714 |
| | | | | 360/132 |
| 5,784,227 A * | 7/1998 | Kitamura | ......... | G11B 23/08714 |
| | | | | 360/132 |
| 6,065,701 A * | 5/2000 | Tanimura | ................ | G11B 23/40 |
| | | | | 242/344 |
| 6,124,999 A * | 9/2000 | Yamamoto | ........... | G11B 15/023 |
| | | | | 360/13 |
| 6,421,196 B1 * | 7/2002 | Takayama | .......... | G11B 23/0233 |
| | | | | 340/5.8 |
| 6,667,846 B2 * | 12/2003 | Kano | ................ | G11B 15/67547 |
| | | | | 360/96.51 |

(Continued)

FOREIGN PATENT DOCUMENTS

| | | |
|---|---|---|
| JP | 2006-092707 A | 4/2006 |
| JP | 2006-323918 A | 11/2006 |

*Primary Examiner* — Jefferson A Evans
(74) *Attorney, Agent, or Firm* — Solaris Intellectual Property Group, PLLC (57) ABSTRACT

A magnetic tape cartridge includes: a magnetic tape on which data is recorded; and a recording medium other than the magnetic tape, and on which a keyword for searching the data recorded on the magnetic tape is recorded.

14 Claims, 5 Drawing Sheets

(56) References Cited

U.S. PATENT DOCUMENTS

| | | | | |
|---|---|---|---|---|
| 7,126,791 | B2* | 10/2006 | Hiraguchi | G11B 23/40 |
| | | | | 360/132 |
| 7,227,721 | B1* | 6/2007 | Kientz | G11B 23/042 |
| 8,131,263 | B2* | 3/2012 | Endrikhovski | G06Q 10/087 |
| | | | | 360/92.1 |
| 9,824,720 | B1* | 11/2017 | Breuer | G11B 23/06 |
| 2002/0023956 | A1* | 2/2002 | Kaneko | G11B 27/11 |
| | | | | 235/385 |
| 2004/0165313 | A1* | 8/2004 | Onmori | G11B 23/0305 |
| | | | | 360/132 |
| 2013/0135773 | A1* | 5/2013 | Mojica | G11B 19/06 |
| | | | | 242/332.1 |
| 2016/0012844 | A1* | 1/2016 | Nylander-Hill | G06F 11/0787 |
| | | | | 369/53.42 |
| 2020/0336295 | A1* | 10/2020 | Winarski | G11B 5/78 |

* cited by examiner

| KEYWORD | DATA NAME | RECORDING POSITION |
|---|---|---|
| KEYWORD A | A.doc | p1 |
| | D.txt | p4 |
| | ... | ... |
| KEYWORD B | C.jpg | p9 |
| ... | ... | ... |

MAGNETIC TAPE CARTRIDGE, RECORDING DEVICE, RECORDING METHOD, REPRODUCING SYSTEM, AND REPRODUCING METHOD

CROSS-REFERENCE TO RELATED APPLICATION

This application claims priority from Japanese Patent Application No. 2019-176489, filed Sep. 27, 2019, the disclosure of which is incorporated herein by reference in its entirety.

BACKGROUND

Technical Field

The present disclosure relates to a magnetic tape cartridge, a recording device, a recording method, a reproducing system, a reproducing method, and a storage medium.

Related Art

A technology of recording data relevant information regarding backup data recorded on a magnetic tape comprised in a magnetic tape cartridge, on an integrated circuit (IC) tag comprised in the magnetic tape cartridge is disclosed (see JP2006-323918A). In this technology, a content, a type, recording date, and the like of backup data are recorded on the IC tag as data relevant information.

In addition, a technology of recording index information in which a search keyword for specifying a category of data recorded on a magnetic tape comprised in a magnetic tape cartridge and identification information of the magnetic tape cartridge are associated with each other, on a magnetic disk is disclosed (see JP2006-092707A).

Data recorded on a magnetic tape could not read unless the magnetic tape is pulled out from a housing of a magnetic tape cartridge, and therefore, it was not always easy for searching.

With the data relevant information recorded on an IC tag disclosed in JP2006-323918A, it is possible to search which data is recorded, but it is not possible to search for data including a keyword desired by a user to search for.

In addition, in the technology disclosed in JP2006-092707A, a search keyword and a magnetic tape cartridge are associated with each other on one-to-one, and the search keyword is used as an index. Accordingly, in order for the user to search for target data from the magnetic tape, it was necessary to grasp which data is recorded on the magnetic tape, and thus, the searchability was not always high.

SUMMARY

The disclosure has been made in view of the above circumstances, and provides a magnetic tape cartridge, a recording device, a recording method, a reproducing system, a reproducing method and a storage medium capable of improving searchability of data recorded on a magnetic tape.

A magnetic tape cartridge according to an aspect the disclosure comprises: a magnetic tape on which data is recorded; and a recording medium other than the magnetic tape, and on which a keyword for searching the data recorded on the magnetic tape is recorded.

In the magnetic tape cartridge of the disclosure, the data recorded on the magnetic tape may be data including a text, and the keyword may be a word extracted from the data recorded on the magnetic tape.

In the magnetic tape cartridge of the disclosure, the data may include a title, an attribute, and a body text, and the keyword may include at least a word extracted from the body text.

In the magnetic tape cartridge of the disclosure, the body text may include a description of at least one of an image or a chart.

In the magnetic tape cartridge of the disclosure, a plurality of data pieces are recorded on the magnetic tape, and at least one of the keywords is associated with at least two of the plurality of data pieces recorded on the magnetic tape.

A recording device according to another aspect of the disclosure comprises: a recording unit that records, on a recording medium of a magnetic tape cartridge, a keyword for searching data recorded on a magnetic tape, the magnetic tape cartridge including the magnetic tape on which the data is recorded, and the recording medium other than the magnetic tape.

A recording method according to still another aspect of the disclosure comprises: recording, on a recording medium of a magnetic tape cartridge, a keyword for searching data recorded on a magnetic tape, the magnetic tape cartridge including the magnetic tape on which the data is recorded, and the recording medium other than the magnetic tape.

A reproducing system according to still another aspect of the disclosure comprises: at least one magnetic tape cartridge comprising a magnetic tape on which data is recorded, and a recording medium other than the magnetic tape, and on which a keyword for searching the data recorded on the magnetic tape is recorded; a reception unit that receives a keyword input by a user; an identification unit that identifies, from the at least one magnetic tape cartridge, a magnetic tape cartridge including the recording medium on which the keyword received by the reception unit is recorded; and a controller that performs control of reproduction of data including the keyword for searching from the magnetic tape of the magnetic tape cartridge identified by the identification unit.

A reproducing method according to still another aspect of the disclosure comprises: receiving a keyword input by a user; identifying, from at least one magnetic tape cartridge, a magnetic tape cartridge including a recording medium on which the received keyword is recorded, each of the magnetic tape cartridge including a magnetic tape on which data is recorded, and a recording medium other than the magnetic tape, and on which a keyword for searching the data recorded on the magnetic tape is recorded; and reproducing data including the keyword for searching from the magnetic tape of the identified magnetic tape cartridge.

Still another aspect of the disclosure is a non-transitory storage medium storing a program that causes a reproducing system to perform a reproducing processing, the reproducing processing comprising: receiving a keyword input by a user; identifying, from at least one magnetic tape cartridge, a magnetic tape cartridge including a recording medium on which the received keyword is recorded, each of the magnetic tape cartridge including a magnetic tape on which data is recorded, and a recording medium other than the magnetic tape, and on which a keyword for searching the data recorded on the magnetic tape is recorded; and reproducing data including the keyword for searching from the magnetic tape of the identified magnetic tape cartridge.

According to the disclosure, it is possible to increase searchability of data recorded on a magnetic tape.

DETAILED DESCRIPTION

Hereinafter, embodiments for carrying out the technology of the disclosure will be described in detail with reference to the drawings.

Figure 1:
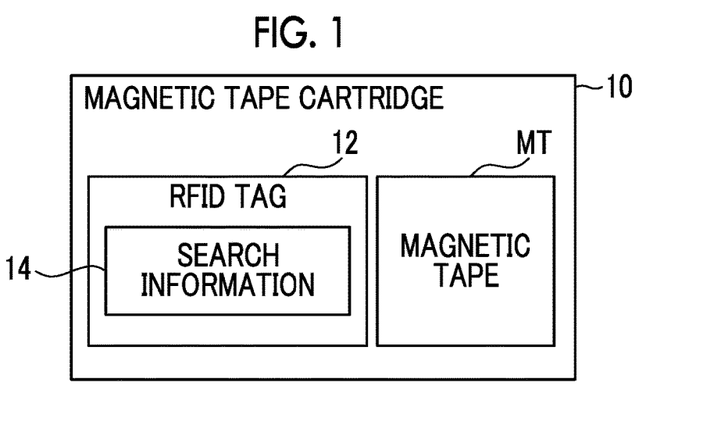
FIG. 1 is a block diagram showing an example of a configuration of a magnetic tape cartridge.

A configuration of a magnetic tape cartridge 10 according to the embodiment will be described with reference to FIG. 1. As shown in FIG. 1, the magnetic tape cartridge 10 comprises a magnetic tape MT, on which information is magnetically recorded, and a radio frequency identifier (RFID) tag 12 as an example of a recording medium, other than the magnetic tape MT, on which information can be recorded and read in a contactless manner by wireless communication or the like. On the RFID tag 12, search information 14 and the like used for searching target data from a plurality of data pieces recorded on the magnetic tape MT are recorded. The search information 14 will be described later in detail. An example of the magnetic tape MT is a linear tape-open (LTO) tape.

Figure 2:
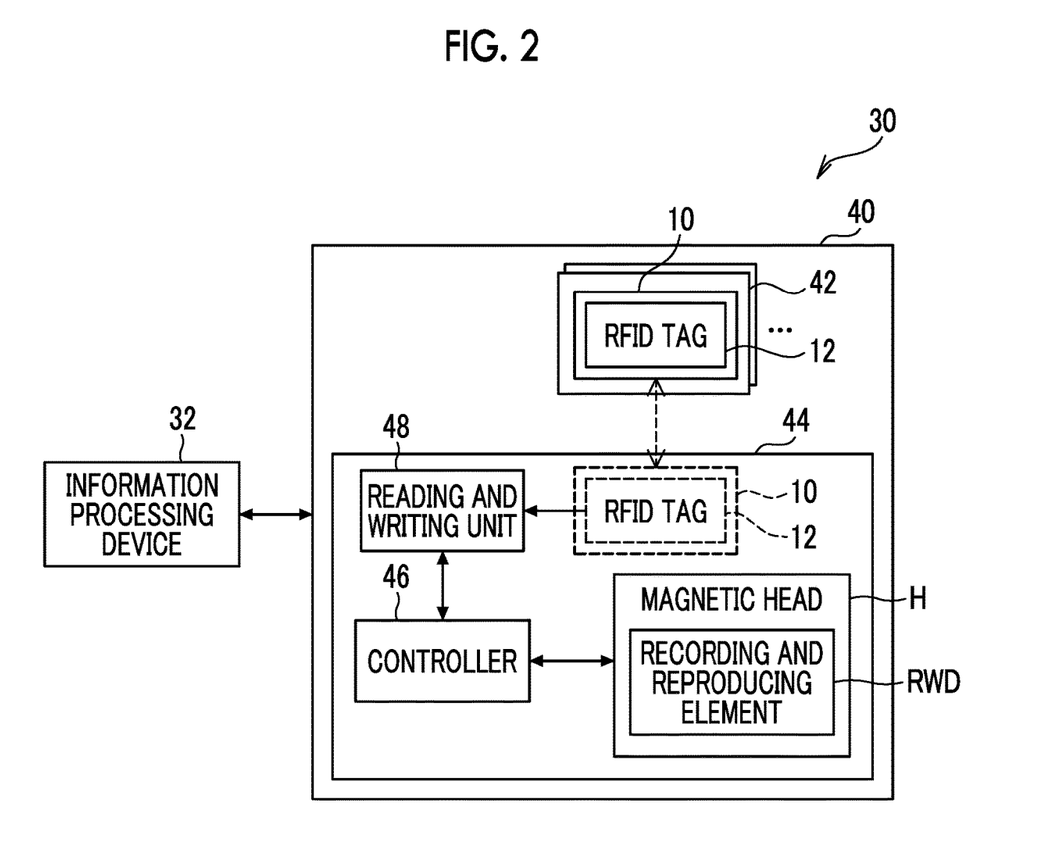
FIG. 2 is a block diagram showing an example of a configuration of a recording and reproducing system.

A configuration of a recording and reproducing system 30 for recording and reproducing data with respect to the magnetic tape cartridge 10 will be described with reference to FIG. 2. As shown in FIG. 2, the recording and reproducing system 30 includes an information processing device 32 and a tape library 40. The tape library 40 comprises a plurality of slots 42 and tape drives 44. The recording and reproducing system 30 is an example of a reproducing system according to the technology of the disclosure, and the tape drive 44 is an example of a recording device according to the technology of the disclosure.

The magnetic tape cartridge 10 is stored in the slot 42. In the tape drive 44, the magnetic tape cartridge 10 extracted from the slot 42 is loaded. In addition, after completing the recording or reproducing of the data with respect to the magnetic tape MT of the magnetic tape cartridge 10 loaded in the tape drive 44, the magnetic tape cartridge 10 is unloaded from the tape drive 44 and stored in the slot 42.

The tape drive 44 comprises a controller 46, a reading and writing unit 48, and a magnetic head H. The magnetic head H comprises a recording and reproducing element RWD including a recording element for recording data on the magnetic tape MT and a reproducing element for reproducing data from the magnetic tape MT. The reproducing here refers to reading a signal representing data or the like recorded on the magnetic tape MT. The controller 46 is an example of a recording unit, a specifying unit, and a controller according to the technology of the disclosure.

The reading and writing unit 48 reads information recorded on the RFID tag 12 mounted in the magnetic tape cartridge 10 in a contactless manner and outputs the read information to the controller 46, by the control of the controller 46. In addition, the reading and writing unit 48 records information on the RFID tag 12 in a contactless manner by the control of the controller 46. As an example of the reading and writing unit 48, an RFID reader and writer is used.

The controller 46 includes a programmable logic device (PLD), a memory as a temporary storage, and a non-volatile storage unit. The controller 46 controls the reading and writing unit 48, the magnetic head H, and the like.

Figure 3:
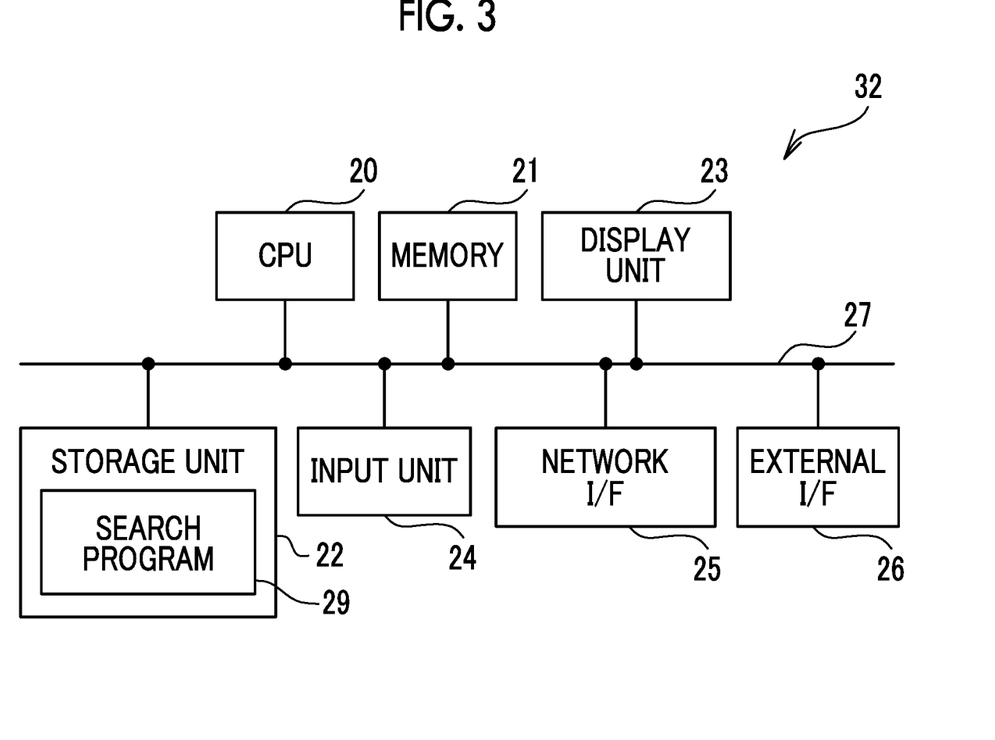
FIG. 3 is a block diagram showing an example of a hardware configuration of an information processing device.

Next, a hardware configuration of the information processing device 32 according to the embodiment will be described with reference to FIG. 3. As shown in FIG. 3, the information processing device 32 includes a central processing unit (CPU) 20, a memory 21 as a temporary storage area, and a non-volatile storage unit 22. The information processing device 32 includes a display unit 23 such as a liquid crystal display, an input unit 24 such as a keyboard, a mouse and the like, a network interface (I/F) 25 connected to a network, and an external I/F 26 connected to the tape library 40. The CPU 20, the memory 21, the storage unit 22, the display unit 23, the input unit 24, the network I/F 25, and the external I/F 26 are connected to a bus 27. Examples of the information processing device 32 include a personal computer, a server computer, and the like.

The storage unit 22 is realized by a Hard Disk Drive (HDD), a Solid State Drive (SSD), a flash memory, or the like. A search program 29 is stored in the storage unit 22 as a storage medium. The CPU 20 reads the search program 29 from the storage unit 22, expands it in the memory 21, and executes the expanded search program 29.

Figure 4:
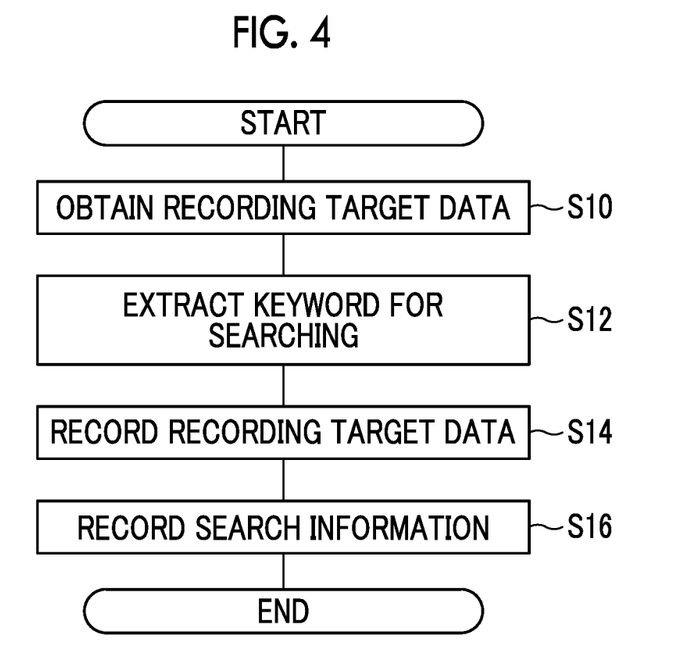
FIG. 4 is a flowchart showing an example of a data recording process.

Next, a flow of a data recording process in which the recording and reproducing system 30 records data on the magnetic tape cartridge 10 will be described with reference to FIG. 4. The data recording process shown in FIG. 4 is executed by the controller 46 of the tape drive 44, for example, in a case where a plurality of data pieces to be recorded (hereinafter, referred to as "recording target data") are input from the information processing device 32 to the tape drive 44. Here, it is assumed that the data recording process is executed in a state where the magnetic tape cartridge 10 is loaded in the tape drive 44. In this embodiment, an example in which each recording target data is data including a text will be described. The data including a text here is not limited to document data, and includes, for example, image data to which an attribute including a text is added. In addition, the recording target data also includes data including a data title, an attribute, and a body text. Further, in a case where the recording target data is data including at least one of an image or a chart, a body text of the data includes a description of at least one of the image or the chart.

In Step S10 of FIG. 4, the controller 46 obtains a plurality of recording target data pieces input from the information processing device 32 to the tape drive 44. In Step S12, the controller 46 extracts a keyword for searching each recording target data from each recording target data. Specifically, for example, the controller 46 performs a well-known natural language process with respect to each recording target data to extract a word from each recording target data. Then, for each recording target data, the controller 46 extracts, for example, the predetermined number of words in descending order of frequency as keywords for searching the recording target data. In a case where the recording target data includes a body text, this word extraction process is performed with respect to at least the body text. The extraction process of the keyword for searching in Step S12 may be executed by the CPU 20 of the information processing device 32.

In Step S14, the controller 46 controls the magnetic head H to record the plurality of recording target data pieces obtained in Step S10 on the magnetic tape MT. In Step S16, the controller 46 controls the reading and writing unit 48 to record the search information 14, in which the keyword for searching extracted from each recording target data in Step S12, identification information of each recording target data obtained in Step S10, and a recording position of each recording target data on the magnetic tape MT are associated with each other, on the RFID tag 12. In a case where the process of Step S16 ends, the data recording process ends. In a case where the data recording process ends, the magnetic tape cartridge 10 is unloaded from the tape drive 44. After the data recording process ends, the next operation may be waited for without unloading the magnetic tape cartridge 10 from the tape drive 44.

Figure 5:
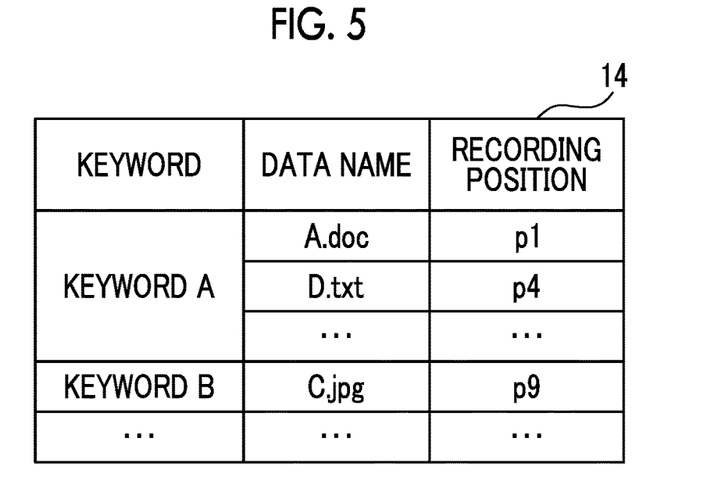
FIG. 5 is a diagram showing an example of search information.

By the data recording process shown in FIG. 4, a plurality of data pieces are recorded on the magnetic tape MT, and the search information 14 is recorded on the RFID tag 12. FIG. 5 shows an example of the search information 14. As shown in FIG. 5, the search information 14 is information in which the keyword for searching, the identification information of data (data name in the example of FIG. 5), and the recording position of the data on the magnetic tape MT are associated with each other. In this embodiment, at least one keyword for searching is associated with at least two of the plurality of data pieces recorded on the magnetic tape MT. An example of the recording position of the data on the magnetic tape MT is a combination of the data band number of the magnetic tape MT and information indicating a position in a longitudinal direction of the magnetic tape MT.

Figure 6:
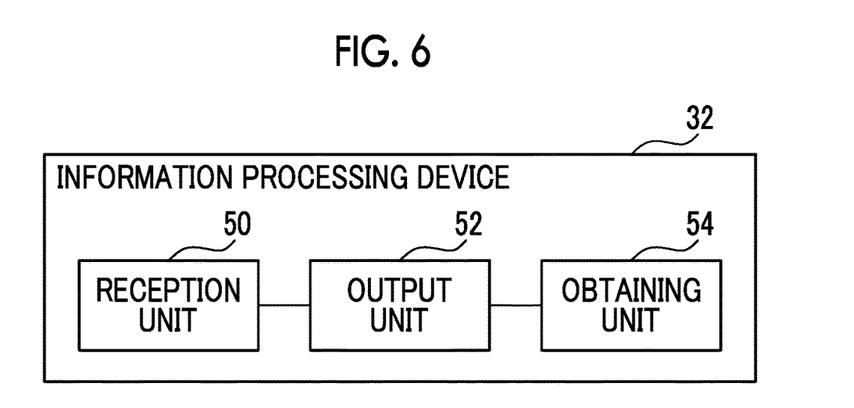
FIG. 6 is a block diagram showing an example of a functional configuration of the information processing device.

Next, a functional configuration of the information processing device 32 according to the embodiment will be described with reference to FIG. 6. As shown in FIG. 6, the information processing device 32 includes a reception unit 50, an output unit 52, and an obtaining unit 54. The CPU 20 executes the search program 29 to function as the reception unit 50, the output unit 52, and the obtaining unit 54.

The reception unit 50 receives a keyword input by the user via the input unit 24. The reception unit 50 may receive a keyword which is input by a user to a terminal device (not shown) connected to the information processing device 32 for communication via a network and transmitted from the terminal device, via the network I/F 25.

The output unit 52 outputs the keyword received by the reception unit 50 to the tape drive 44. The obtaining unit 54 obtains the data output from the tape drive 44 in response to the keyword output from the output unit 52 to the tape drive 44. Then, the obtaining unit 54 stores the obtained data in the storage unit 22.

Next, a flow of a search process of the data will be described with reference to FIGS. 7 and 8. The search process shown in FIG. 7 is executed by the CPU 20 of the information processing device 32, in a case where the user inputs a keyword via the input unit 24.

Figure 7:
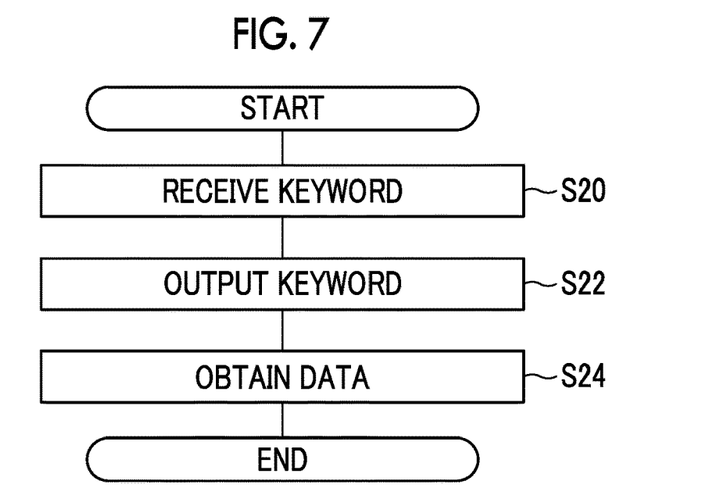
FIG. 7 is a flowchart showing an example of a search process executed by the information processing device.

In Step S20 of FIG. 7, the reception unit 50 receives a keyword input by the user via the input unit 24. In Step S22, the output unit 52 outputs the keyword received in Step S20 to the tape drive 44. In Step S24, the obtaining unit 54 obtains the data output from the tape drive 44 by the process of Step S40 of the search process shown in FIG. 8 which will be described later, in response to the keyword output to the tape drive 44 by the process of Step S22. Then, the obtaining unit 54 stores the obtained data in the storage unit 22. In a case where the process of Step S24 ends, the search process shown in FIG. 7 ends.

Figure 8:
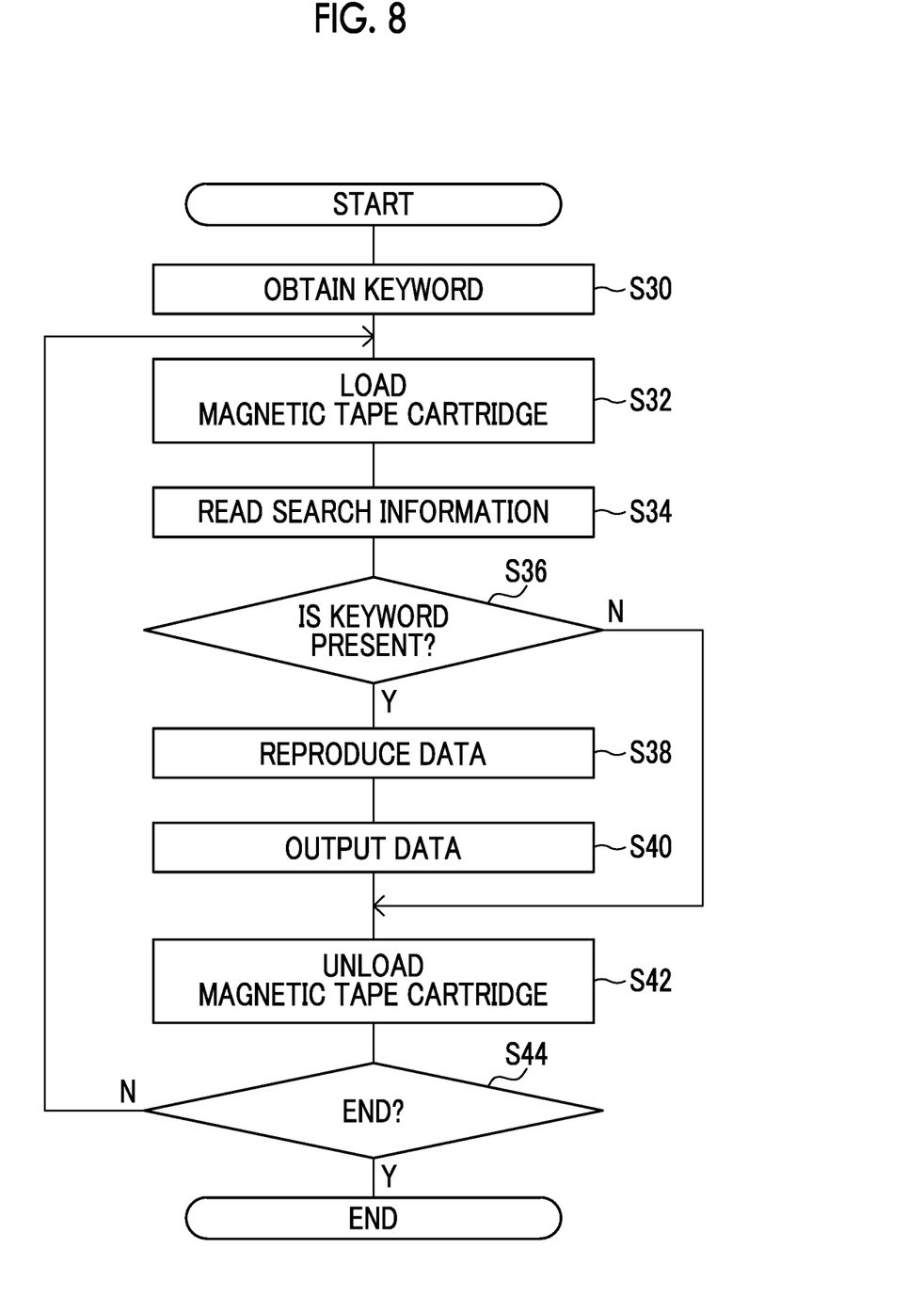
FIG. 8 is a flowchart showing an example of a search process executed by a tape drive.

In a case where the keyword is input to the tape drive 44 by the process of Step S22 of the search process shown in FIG. 7, the controller 46 of the tape drive 44 executes the search process shown in FIG. 8.

In Step S30 of FIG. 8, the controller 46 obtains a keyword input from the information processing device 32 by the process of Step S22 of FIG. 7. In Step S32, the controller 46 controls a moving mechanism (not shown) that moves the magnetic tape cartridge 10 to load the magnetic tape cartridge 10 stored in the slot 42 into the tape drive 44. In a case where the process of Step S32 is repeatedly executed, the magnetic tape cartridge 10 that has not been loaded by that time is targeted for the process.

In Step S34, the controller 46 controls the reading and writing unit 48 to read the search information 14 recorded on the RFID tag 12 of the magnetic tape cartridge 10 loaded in the tape drive 44 in Step S32. Then, the controller 46 obtains the search information 14 read by the reading and writing unit 48.

In Step S36, the controller 46 determines whether or not the search keyword included in the search information 14 obtained in Step S34 includes the keyword obtained in Step S30. In a case where the determination is negative, the process proceeds to Step S42, and in a case where the determination is affirmative, the process proceeds to Step S38. Through the process of Step S36, the controller 46 functions as a specifying unit that specifies the magnetic tape cartridge 10 including the RFID tag 12, on which the keyword received by the reception unit 50 is recorded, among the plurality of magnetic tape cartridges 10.

In Step S38, the controller 46 controls the magnetic head H to reproduce data of a data name corresponding to the keyword obtained in Step S30 in the search information 14 obtained in Step S34, from the corresponding recording position on the magnetic tape MT. Then, the controller 46 obtains the data reproduced by the magnetic head H.

In Step S40, the controller 46 outputs the data obtained in Step S38 to the information processing device 32. In Step S42, the controller 46 unloads the magnetic tape cartridge 10 from the tape drive 44. The unloaded magnetic tape cartridge 10 is accommodated in the slot 42.

In Step S44, the controller 46 determines whether or not a predetermined end timing has arrived. In a case where the determination is negative, the process returns to Step S32, and in a case where the determination is affirmative, the search process shown in FIG. 8 ends. An example of this end timing is timing at which the execution of the processes from Step S32 to Step S42 for all the magnetic tape cartridges 10 to be searched is completed. In a case where the tape library 40 comprises a plurality of tape drives 44, the processes from Step S30 to Step S44 may be executed in parallel using the plurality of tape drives 44. In this case, the magnetic tape cartridge 10 to be searched is predetermined for each tape drive 44.

As described above, according to the embodiment, the magnetic tape cartridge 10, on which the data including a free keyword input by the user is recorded, can be searched from the plurality of magnetic tape cartridges 10. Accordingly, the user can search for the target data without grasping which data is recorded on each magnetic tape cartridge 10. Therefore, it is possible to increase searchability of the data recorded on the magnetic tape.

In addition, according to the embodiment, the keyword for searching is recorded on the RFID tag 12 comprised in the magnetic tape cartridge 10. Therefore, in a case where the magnetic tape cartridge 10 is transferred to another system, the data recorded on the magnetic tape cartridge 10 can be searched without updating management information.

In the embodiment, the case where all data pieces including the keyword input by the user are reproduced has been described, but there is no limitation thereto. For example, the display unit 23 may display a list of all data pieces including the keywords input by the user. In this case, the user selects the target data from the list of data displayed on the display unit 23. In this case, the controller 46 controls the magnetic head H to reproduce only the data selected by the user from all the data pieces including the keyword input by the user.

Figure 9:
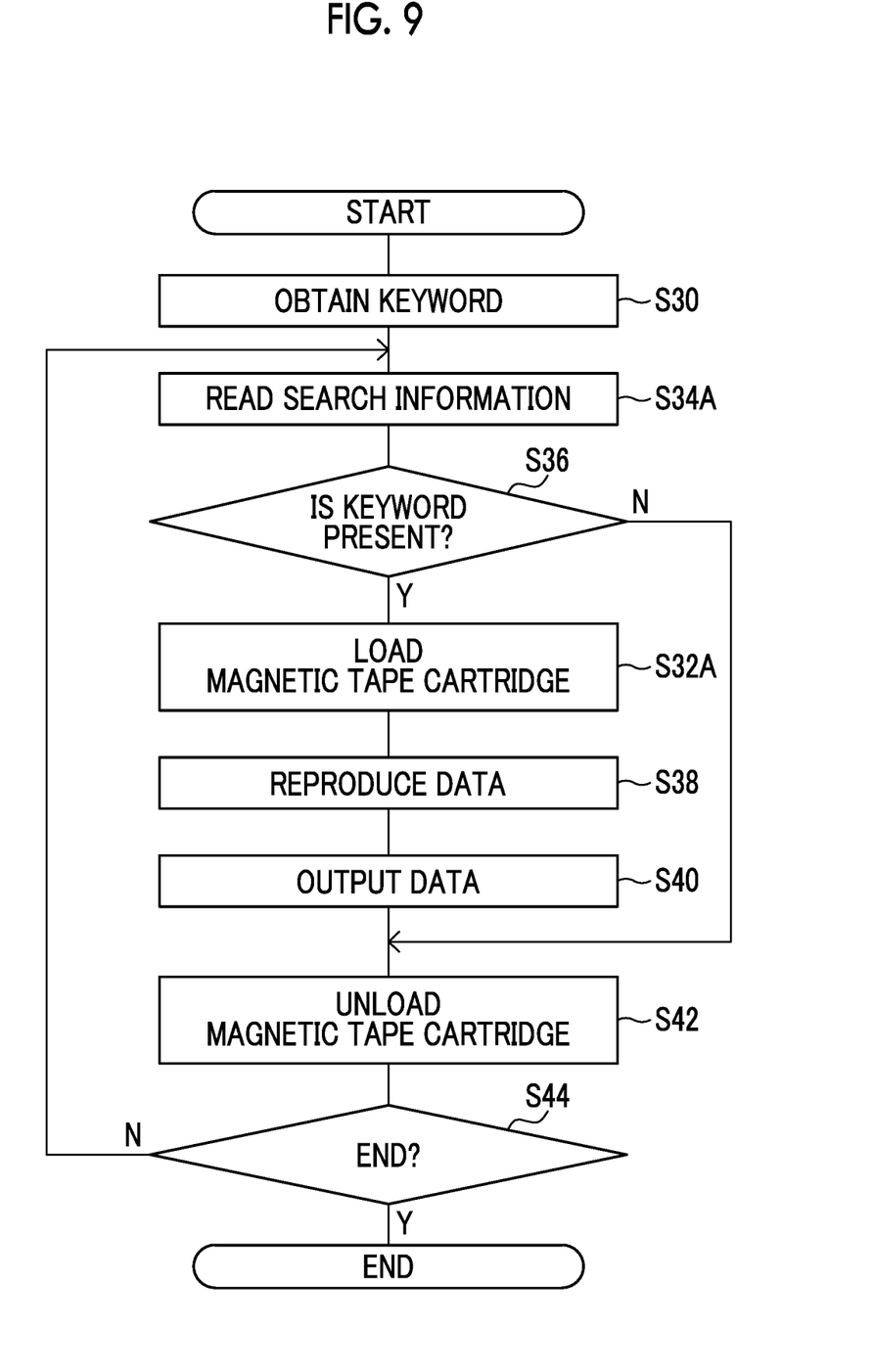
FIG. 9 is a flowchart showing an example of a search process executed by a tape drive according to a modification example.

In addition, in the embodiment, the moving mechanism that moves the magnetic tape cartridge 10 between the slot 42 and the tape drive 44 may be provided with a reading unit that reads the information recorded on the RFID tag 12 in a contactless manner. FIG. 9 shows an example of a flow of the search process executed by the controller 46 in this embodiment. The same reference numerals are used for Steps in FIG. 9 in which the same processes are executed as in FIG. 8, and the description thereof will be omitted. In FIG. 9, Step S32A, which replaces Step S32 of FIG. 8, is executed between Steps S36 and S38. In addition, in FIG. 9, Step S34A is executed instead of Step S34 of FIG. 8. Further, in FIG. 9, in a case where the determination in Step S36 is negative, the process proceeds to Step S44.

In Step S34A of FIG. 9, the controller 46 controls the reading unit provided in the moving mechanism to read the search information 14 recorded on the RFID tag 12 of the magnetic tape cartridge 10 accommodated in the slot 42. Then, the controller 46 obtains the search information 14 read by the reading unit. In a case where the process of Step S34A is repeatedly executed, the magnetic tape cartridge 10 in which the search information 14 recorded on the RFID tag 12 has not been read yet is targeted.

In Step S32A, the controller 46 controls the moving mechanism to load the magnetic tape cartridge 10 in which the search information 14 is read in Step S34A into the tape drive 44. In this embodiment, only the magnetic tape cartridge 10, in which the data including the keyword input by the user is recorded, is loaded into the tape drive 44, among all the magnetic tape cartridges 10 to be searched, and thus, it is possible to shorten search time, compared to the aforementioned embodiment.

In addition, the controller 46 of the tape drive 44 may comprise functional units such as the reception unit 50 and the like comprised in the information processing device 32 in the aforementioned embodiment.

EXPLANATION OF REFERENCES

What is claimed is:

1. A recording device comprising:
   a recording unit that records, on a recording medium of a magnetic tape cartridge, a keyword for searching data recorded on a magnetic tape, the magnetic tape cartridge including the magnetic tape on which the data is recorded, and the recording medium; and
   a controller;
   wherein the data includes text data, and
   the controller is configured to perform a natural language process on the text data to extract the keyword from the text data.

2. The recording device according to claim 1, wherein extraction of the word from the text data is performed before the data is recorded on the magnetic tape.

3. The recording device according to claim 1, wherein the recording medium comprises an RFID tag.

4. A recording method comprising:
   providing a magnetic tape cartridge comprising a recording medium and a magnetic tape;
   recording, on the recording medium, a keyword for searching data recorded on the magnetic tape;
   wherein the data includes text data, and
   the keyword is a word extracted from the text data by performing a natural language process on the text data.

5. The recording method according to claim 4, wherein extraction of the word from the text data is performed before the data is recorded on the magnetic tape.

6. The recording method according to claim 4, wherein the recording medium comprises an RFID tag.

7. A reproducing system comprising:
   at least one magnetic tape cartridge comprising a magnetic tape on which data is recorded, and a recording medium on which a keyword for searching the data recorded on the magnetic tape is recorded;
   a memory; and
   a processor coupled to the memory and configured to:
   receive a keyword input by a user;
   identify, from the at least one magnetic tape cartridge, a magnetic tape cartridge including the recording medium on which the keyword received by the reception unit is recorded; and
   perform control of reproduction of data including the keyword for searching from the magnetic tape of the magnetic tape cartridge identified by the identification unit;
   wherein the data includes text data, and
   the keyword is a word extracted from the text data by performing a natural language process on the text data.

8. The magnetic tape cartridge according to claim 7, wherein extraction of the word from the text data is performed before the data is recorded on the magnetic tape.

9. The magnetic tape cartridge according to claim 7, wherein the recording medium comprises an RFID tag.

10. The reproducing system according to claim 7, wherein the identification unit identifies the magnetic tape cartridge including the recording medium on which the keyword is recorded by reading the recording medium in a contactless manner and searching the keyword in the recording medium.

11. A reproducing method comprising:
    receiving a keyword input by a user;
    identifying, from at least one magnetic tape cartridge, a magnetic tape cartridge including a recording medium on which the received keyword is recorded, each of the magnetic tape cartridge including a magnetic tape on which data is recorded, and a recording medium other than the magnetic tape, and on which a keyword for searching the data recorded on the magnetic tape is recorded; and
    reproducing data including the keyword for searching from the magnetic tape of the identified magnetic tape cartridge;
    wherein the data includes text data, and
    the keyword is a word extracted from the text data by performing a natural language process on the text data.

12. The reproducing method according to claim 11, wherein the identifying comprises identifying the magnetic tape cartridge including the recording medium on which the keyword is recorded by reading the recording medium in a contactless manner and searching the keyword in the recording medium.

13. A non-transitory storage medium storing a program that causes a reproducing system to perform a reproducing processing, the reproducing processing comprising:
   receiving a keyword input by a user;
   identifying, from at least one magnetic tape cartridge, a magnetic tape cartridge including a recording medium on which the received keyword is recorded, each of the magnetic tape cartridge including a magnetic tape on which data is recorded, and a recording medium other than the magnetic tape, and on which a keyword for searching the data recorded on the magnetic tape is recorded; and
   reproducing data including the keyword for searching from the magnetic tape of the identified magnetic tape cartridge;
   wherein the data includes text data and
   the keyword is a word extracted from the text data by performing a natural language process on the text data.

14. The non-transitory storage medium according to claim 13, wherein the identifying comprises identifying the magnetic tape cartridge including the recording medium on which the keyword is recorded by reading the recording medium in a contactless manner and searching the keyword in the recording medium.

\* \* \* \* \*